US010886809B2

(12) United States Patent
Simonsen et al.

(10) Patent No.: US 10,886,809 B2
(45) Date of Patent: Jan. 5, 2021

(54) ELECTRICAL ISOLATION MOUNTING OF ELECTRICAL MACHINE STATOR

(71) Applicant: VESTAS WIND SYSTEMS A/S, Aarhus N (DK)

(72) Inventors: Lars Dyred Simonsen, Otterup (DK); Peter Mongeau, Center Conway, NH (US)

(73) Assignee: VESTAS WIND SYSTEMS A/S, Aarhus (DK)

( * ) Notice: Subject to any disclaimer, the term of this patent is extended or adjusted under 35 U.S.C. 154(b) by 0 days.

(21) Appl. No.: 16/473,151

(22) PCT Filed: Nov. 28, 2017

(86) PCT No.: PCT/DK2017/050397
§ 371 (c)(1),
(2) Date: Jun. 24, 2019

(87) PCT Pub. No.: WO2018/113865
PCT Pub. Date: Jun. 28, 2018

(65) Prior Publication Data
US 2019/0356191 A1    Nov. 21, 2019

Related U.S. Application Data

(60) Provisional application No. 62/438,549, filed on Dec. 23, 2016.

(30) Foreign Application Priority Data

Jan. 24, 2017    (DK) .................................. 2016 70045

(51) Int. Cl.
*H02K 3/42*    (2006.01)
*F03D 9/25*    (2016.01)
(Continued)

(52) U.S. Cl.
CPC ............... *H02K 3/42* (2013.01); *F03D 9/255* (2017.02); *H02K 3/38* (2013.01); *H02K 3/50* (2013.01);
(Continued)

(58) Field of Classification Search
CPC .. H02K 3/38; H02K 3/42; H02K 3/50; H02K 5/24; H02K 7/103; H02K 7/116;
(Continued)

(56) References Cited

U.S. PATENT DOCUMENTS 3,324,368 A * 6/1967 Von Delden ........... H02K 17/04
                                                   318/778
9,112,343 B1   8/2015 White et al.
(Continued)

FOREIGN PATENT DOCUMENTS

DE    10323255 A1    12/2004
EP     2469687 A2     6/2012
(Continued)

OTHER PUBLICATIONS

PCT Written Opinion of the International Searching Authority for Application No. PCT/DK2017/050397 dated Jan. 30, 2018.
(Continued)

*Primary Examiner* — Pedro J Cuevas
(74) *Attorney, Agent, or Firm* — Patterson + Sheridan, LLP

(57) ABSTRACT

The present invention relates to a wind turbine with an electrical machine wherein said electrical machine comprises a stator (702) with one or more electrical winding(s) (704), said electrical winding(s) being arranged to be connected to an electrical grid (760) by at least one cable (740) with at least one phase conductor (746), the at least one cable (740) comprises at least one return path (744) to conduct leakage currents, and at least one electrical shield (745), the
(Continued)

stator being electrically isolated from a stator housing (701). The invention also relates to a method for minimizing stray currents in an electrical machine in a wind turbine.

13 Claims, 8 Drawing Sheets

(51) Int. Cl.
| | |
|---|---|
| *H02K 3/38* | (2006.01) |
| *H02K 3/50* | (2006.01) |
| *H02K 5/24* | (2006.01) |
| *H02K 7/00* | (2006.01) |
| *H02K 7/116* | (2006.01) |
| *H02K 7/18* | (2006.01) |
| *H02K 11/04* | (2016.01) |

(52) U.S. Cl.
CPC ............... *H02K 5/24* (2013.01); *H02K 7/003* (2013.01); *H02K 7/116* (2013.01); *H02K 7/1838* (2013.01); *H02K 11/046* (2013.01); *F05B 2220/7062* (2013.01); *H02K 2203/15* (2013.01)

(58) Field of Classification Search
CPC ............... H02K 7/1838; H02K 11/046; H02K 2203/15; F03D 9/255; F05B 2220/7062
USPC ...................................... 290/44, 55
See application file for complete search history.

(56) References Cited

U.S. PATENT DOCUMENTS

| | | | | |
|---|---|---|---|---|
| 9,212,661 | B2 * | 12/2015 | Fukasaku | H02K 3/44 |
| 9,518,462 | B2 * | 12/2016 | Downie | E21B 47/12 |
| 9,518,562 | B2 * | 12/2016 | Mongeau | F03D 7/0244 |
| 10,670,310 | B2 * | 6/2020 | Lange | H02K 3/487 |
| 2008/0143285 | A1 | 6/2008 | Lucas | |
| 2010/0097023 | A1 | 4/2010 | Nakamura et al. | |
| 2013/0064697 | A1 * | 3/2013 | Fukasaku | H02K 3/44 |
| | | | | 417/410.1 |
| 2014/0110947 | A1 * | 4/2014 | Mongeau | F03D 9/25 |
| | | | | 290/55 |
| 2015/0308262 | A1 * | 10/2015 | Downie | F03B 13/02 |
| | | | | 340/854.4 |
| 2016/0047359 | A1 * | 2/2016 | Mongeau | F03D 7/0244 |
| | | | | 290/44 |
| 2016/0105066 | A1 | 4/2016 | Horng et al. | |
| 2016/0329780 | A1 | 11/2016 | Reed et al. | |
| 2017/0133901 | A1 * | 5/2017 | Burch | H02K 3/38 |
| 2017/0241680 | A1 * | 8/2017 | Lange | H02K 3/44 |
| 2019/0003753 | A9 * | 1/2019 | Lange | F25B 31/026 |
| 2019/0140527 | A1 * | 5/2019 | Salter | H02K 5/24 |

FOREIGN PATENT DOCUMENTS

| | | |
|---|---|---|
| EP | 2887512 A1 | 6/2015 |
| JP | 2000333396 A | 11/2000 |
| WO | 2007107158 A1 | 9/2007 |
| WO | 2018113865 | 11/2017 |

OTHER PUBLICATIONS

PCT International Search Report for Application No. PCT/DK2017/050397 dated Jan. 30, 2018.
Danish Patent and Trademark Office 1st Technical Examination for Application No. PA 2017 70045 dated Jul. 3, 2017.

* cited by examiner

ELECTRICAL ISOLATION MOUNTING OF ELECTRICAL MACHINE STATOR

BACKGROUND OF THE INVENTION

Electrical generators in wind turbines are often hard mounted to the bedframe of the wind turbine nacelle. This means that there are very good electrical connections between the two. Due to size and loads in a modern multi watt wind turbine, it is difficult to make an electrical isolation between the nacelle and the stator housing. The electrical design of the wind turbine therefore have to take into account that there is a pathway for stray current between the bedframe and the generator housing.

Typically, modern wind turbines are connected to an electric utility grid in order to be able to generate and supply electricity to consumers located remotely from the wind turbines.

The rotor speed of the wind turbine increases and decreases with changing wind speed in order to subtract as much energy from the wind as possible, and consequently the electric generator generates electricity with a variable frequency. The electricity is converted by a frequency converter to electricity with a fixed frequency which is supplied to the electric utility grid.

The frequency converter may introduce different stray currents to the electric generator such as in the shaft and housing of the generator. In order to avoid the stray current it is well known to ground the stationary and rotating parts of the generator.

However, the well known ways of grounding the stationary and rotating parts may often create problems in relation to circling stray currents within the generator. Circulating stray currents may result in bearing corrosion, which negatively affects the service life of the generator.

The phenomenon of bearing currents of line-operated electrical machines, also referred to as "classical" bearing currents, has been known for decades and is investigated thoroughly.

These currents are a parasitic effect and are mainly caused by magnetic asymmetries in the machine. The induced voltage may cause a circulating bearing current. Current may only flow if the induced voltage surpasses a certain threshold to bridge the insulating lubrication film of the bearing. The threshold voltage for this current to occur is typically ~350 mVrms or 500 mVpp.

With increasing motor size, these "classical" bearing currents are more likely to occur, because the parasitic flux linkage increases.

In wind turbine application the electrical machines are most often fed from a variable frequency drive VFD, also called a frequency converter. These converters operates by hard switching a DC voltage at a switching frequency in the kilohertz range, often referred to as pulse width modulation PWM. The hard switching causes even higher issues when it comes to stray currents in the electrical machines.

It is therefore an objective of the present invention to control stray current in electrical machine and thereby limit the bearing currents in the electrical machine especially in wind turbines, in order to avoid damages from the stray currents.

SUMMARY

The embodiments involve the use of an electrically isolating mounting system for a generator stator in a wind turbine, without connection between the stator to a generator housing/system foundation ground. The use of an electrical power connection from the generator to the frequency converter where the shielding is around all phase groups of the power cable, furthermore with a separate protected earth conductor used to carry common mode currents induced by the frequency converter.

A first aspect relates to a wind turbine with an electrical machine wherein said electrical machine comprises a stator with one or more electrical winding(s), said electrical winding(s) being arranged to be connected to an electrical grid by at least one cable with at least one phase conductor, the at least one cable comprises at least one return path to conduct leakage currents, and at least one electrical shield, the stator being electrically isolated from a stator housing.

An advantage of the first aspect is that it greatly reduced stray currents and improves EMC performance in the system. Reduced shield losses and a more robust electrical safety. The aspect presents a combination of isolated stator with connections for isolated common mode current connections.

In an embodiment of the first aspect the electrical winding(s) being connected to the electrical grid through at least one power converter.

In a further aspect the wind turbine of the first aspect, comprises an electrical machine arranged to rotate at a speed range between 100 to 900 RPM. Where the stator is isolated from the stator housing by a plurality of structural isolation bars attached to the stator, the structural isolation bars provide insulation between the stator and the stator housing, while the stator is suspended within the stator housing.

A second aspect relates to a method for minimizing stray currents in an electrical machine in a wind turbine, wherein said electrical machine comprises a stator (702) with one or more electrical winding(s) (704), said electrical winding(s) being arranged to be connected to an electrical grid (760) by at least one cable (740) with at least one phase conductor (746), conducting leakage currents through at least one return path (744) in the at least one cable (740), and shielding the at least one cable (740) with at least one electrical shield (745), isolating the stator electrically from a stator housing (701).

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION

Figure 1:
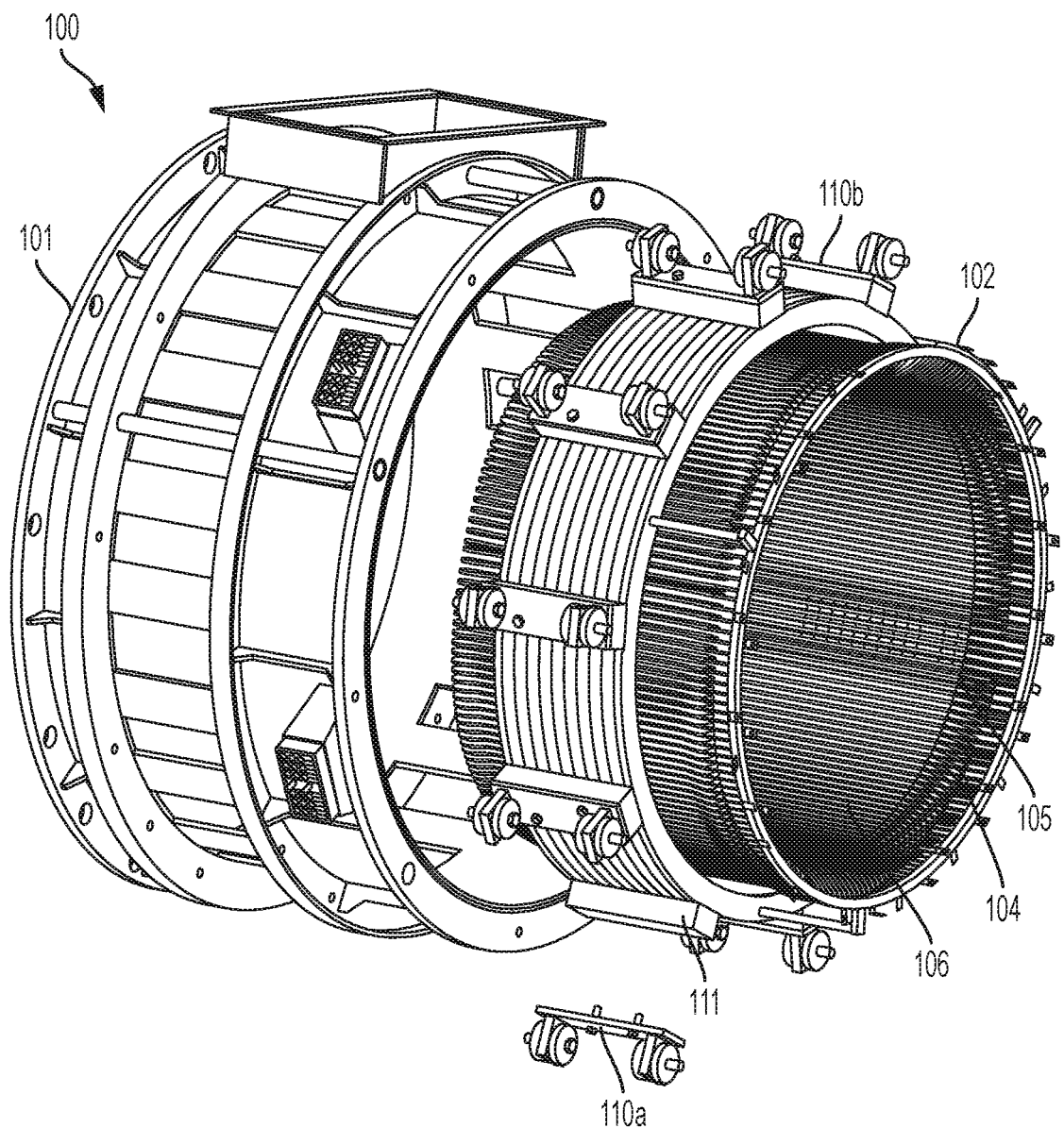
FIG. 1 shows an example of a stator and a stator housing of an electrical machine.

The present invention will now be explained in further details. While the invention is susceptible to various modifications and alternative forms, specific embodiments have been disclosed by way of examples. It should be understood, however, that the invention is not intended to be limited to the particular forms disclosed.

Electrical generators most often comprise a rotor, a stator and a stator housing, where the purpose of the stator and rotor is known to the skilled person, and the housing provides structural support for the stator and together with end shields and bearings, it also provides support for the rotor, and ensures alignment between the rotor and the stator.

Furthermore the housing also provides the means for fixation of the generator 12 to the bed frame of the wind turbine nacelle 5.

The magnetic circuit of the electrical machine includes a laminated stator stack and a laminated rotor stack. These consist of laminated electrical sheets. Depending on the size and diameter of the laminated core stacks, there are a number of options for manufacturing the corresponding sheets, this is seen as known to the skilled person.

Due to weight, the stator housing is often hard mounted to the bed frame of the nacelle 5, as isolated dampers etc. are unsuitable. Thus good electrical connections may exist from the stator housing to the bed frame.

Electrical machines including generators, can be grouped into low speed machines, medium speed machines or high speed machines. Here high speed is understood as an electrical machine rotating at nominal speed higher than 900 rpm (rotation per minute), and medium speed is in the range 100 rpm to 900 rpm, and low speed below 100 rpm. As three types of machines can be made with rated power in the megawatt range, it is clear that the mechanical torque goes up as the speed goes down, and therefore also an increased need for structural support.

It has been known for decades that electrical machines, especially machines fed through a variable frequency drive with PWM generated voltage signals are prone to leakage currents causing sparks in the bearings, through the oil/grease film.

A traditional ball bearing comprises an inner and an outer race way and the rolling elements (balls or rollers). A bearing has a complex, non-linear impedance in the equivalent circuit of an electrical machine.

From a simplified point of view, two ranges of operation can be distinguished that are important for understanding of the mechanisms of additional bearing currents at variable frequency drive supply:

At standstill or at low rotational speed, the lubrication film in the load zone of the bearing is only some nm thick. If voltage is applied across this distance, it can be easily bridged by conducting electrons due to the tunnel effect of quantum mechanics. In this range, the bearing acts as an ohmic resistance.

At normal operational speed, due to hydrodynamic effects, the lubricating film of the bearing is more than 100 times thicker than at standstill, typically (0.1 . . . 2) μm. This lubricating film has insulating properties, and the bearing acts as a capacitor.

In respect of the aspects covered here, the normal operational speed range is most relevant as the frequency converter is not operating at standstill or close to standstill. The generator may rotate slowly during idle mode, i.e. when the wind turbine is disconnected from the grid and the rotor blades are pitched out of the wind.

At inverter-operation, the line-to-ground voltage changes with the switching frequency PWM of the switching elements of the inverter 751 and 752. Similar applies to line-to-neutral voltage. Where the line-to-ground voltage is the difference of potential between an individual phase and the ground. Hence, a three phase system contains the three line-to-ground voltages, one from each phase. The line-to-neutral voltage denotes the difference of potential between an individual phase terminal and the neutral point of the phase connections (e.g. star point in a Y-connected system). Hence, a three phase system contains the three line-to-neutral voltages.

The line-to-line voltage is the difference of potential between two phases of a multi phase system. Hence, a three phase system contains the three line-to-line voltages. Here, this voltage refers to the voltage measured at the terminals. At inverter-operation, this voltage changes with two times the switching frequency of the switching elements of the inverter.

The common mode voltage is the arithmetic mean of the line-to-ground voltages. The neutral-to-ground voltage is the difference of potential between the neutral point of the phase connections (e.g. star point in a Y-connected system) and the grounding connection.

At inverter-operation, the common mode voltage and also the neutral-to-ground voltage changes with three times the switching frequency of the switching elements of the inverter.

At inverter-operation, when the common mode voltage contains high frequency components and an intact lubricating film when the bearing acts as a capacitor, the bearing voltage mirrors the common mode voltage at the motor terminals by a capacitive voltage divider. The difference of potential between inner and outer race of a bearing is called bearing voltage.

The capacitances of electrical machines are usually not of influence at line-operation. They come into effect, when the machine is submitted to a common voltage that contains high frequency components. The five most important capacitances are given by the following parts of a machine:

The stator winding-to-frame capacitance is the capacitance between stator winding at high voltage and stator iron at grounded potential. The different voltage levels are separated by electrical insulation between the winding copper and the stator iron stack.

The phase-to-phase capacitances are formed mainly by the winding parts of the different phases U, V and W in the winding overhang, where they are separated only by winding insulating.

The stator winding-to-rotor capacitance, is given by the gap distance between rotor surface and stator winding, being separated by winding insulation, slot wedges and airgap.

The rotor-to-frame capacitance C is mainly determined by the rotor surface and the laminated stator stack surface at the air-gap, mainly the stator tooth tips.

At intact lubrication film, meaning that the lubrication film has insulating properties, the bearing acts as a capacitor with the bearing capacitance, which insulates the rotor from the stator iron, the stator winding-to-rotor, rotor-to-frame and bearing capacitances form a capacitive voltage divider.

The high frequency common mode voltage at the motor terminals is mirrored over the bearing by this voltage divider, causing the bearing voltage.

Many solutions to the problem of bearing current have been proposed and for high speed machine the solution seems to be ceramic bearings, where part of the bearing (balls or races) is made of, or covered with a layer of ceramic material, which therefore provides an electrical isolation across the bearing.

The use of ceramic bearing balls in low and medium speed electrical machines is difficult due to the dimensions of the bearings, which are much larger than for similar power rating for a high speed machine.

Other solutions such as a ceramic layer on the outer diameter surface of the bearing, has also been used, with less efficient results as the thickness of the ceramic layer is limited and thus a capacitive coupling is still present.

Here it is proposed to electrically isolate the stator from the stator structure, used in combination where the electrical windings in the stator is supplied through cables from the grid, and/or the variable frequency drive which ensures good return path for stray currents. The isolation between stator and stator housing minimizes the leakage current between the ground and the shield.

The primary difference from the above-mentioned system and a traditional high-speed generator system is that the generator stator and associated housing are direct mounted to gearbox (GBX) and foundation. The net result is that the common mode currents in the stator are free to return through multiple paths in accordance to their respective impedances. These return paths are not well controlled or defined and can give rise to undesirable stray currents in other rotating contact paths such as the generator bearings, the GBX gears and the GBX bearings. The end result is that there is no well-defined isolation between system ground and chassis ground, and therefore the net result is that the entire foundation system and direct connected metallic structures can have high frequency voltage and current disturbances relative to each other.

In an isolated stator system, the stator is insulated from the rest of the housing, chassis, rotor, etc. Effective capacitance across this isolation is negligible. Isolated stator system permits a return path for common mode currents via the "isolated ground return". This path is electrically isolated from any housing or chassis and as such prevents the currents and/or voltages associated with common mode from being directly injected into the system.

FIG. 1 shows an example of a stator assembly of an electrical machine 100, starting with the stator structure 101, comprising the structural elements of the machine. The stator 102 itself is preferably made with a plurality of laminated sheets 106, making up a laminated stator 102; the laminated stator has a plurality of stator slots 105, often made by punching materials away from the lamination sheets. A process known to the skilled person. The plurality of stator slots is arranged to receive a plurality of stator windings 104. The stator windings are connected so three or more electrical phases are formed.

The electrical stator winding are therefore located close to the stator 102 as the slots 105 are made with a tight fit for the electrical stator winding, thereby allowing capacitive coupling from the winding 104 to the stator 102.

The stator 102 is mounted with a plurality of structural isolation bars 110a, 110b, between the stator 102 and the structural isolation bars 110 an optional spacer 111 is located.

Figure 2:
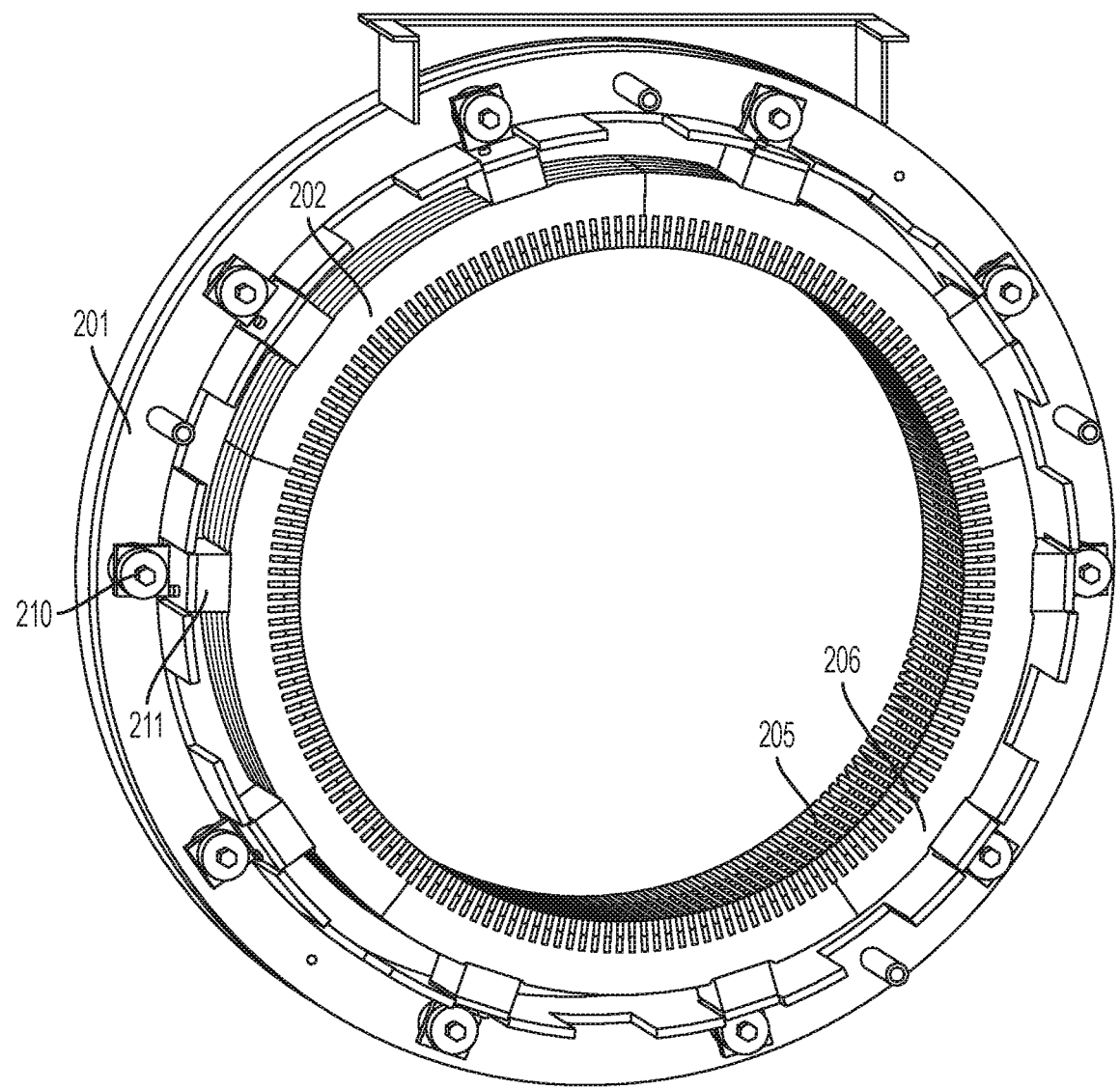
FIG. 2 shows an example of a stator in a stator housing of an electrical machine.

FIG. 2 shows the stator 202 inserted into the stator structure 201, the stator is suspended by the plurality of structural isolation bars 210, where each of the structural isolation bars 210 is raised by means of the spacers 211. The lamination sheets 206 are also seen, together with the stator slots 205; the electrical stator windings 104 are not shown in FIG. 2.

Figure 3:
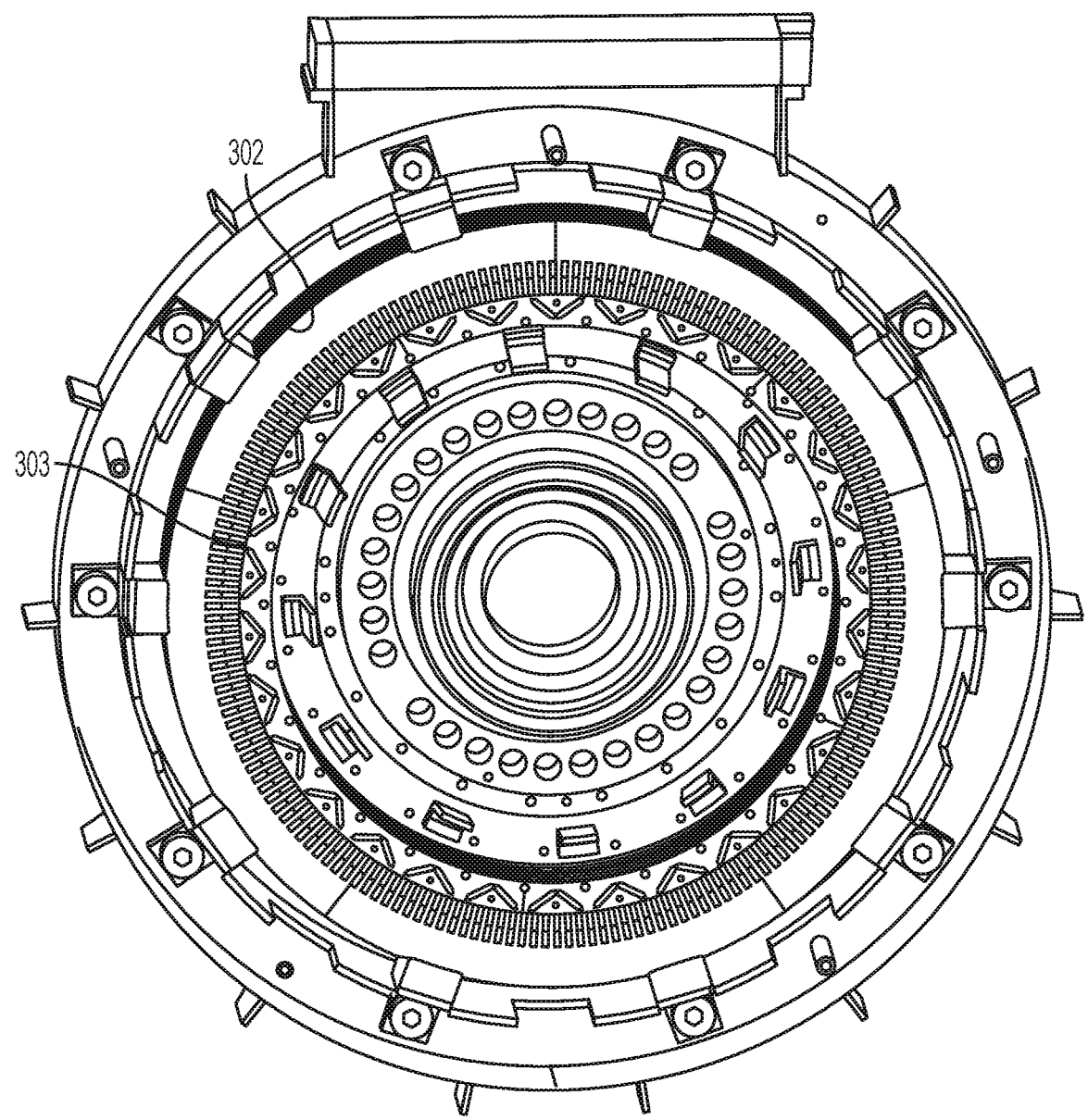
FIG. 3 shows an example of a stator in a stator housing and a rotor of an electrical machine.

FIG. 3 also shows the electrical machine now with a rotor 303 inserted in the stator 302. The actual design of the rotor 303, is not relevant for the present invention as the stray currents are induced in the stator.

Figure 4:
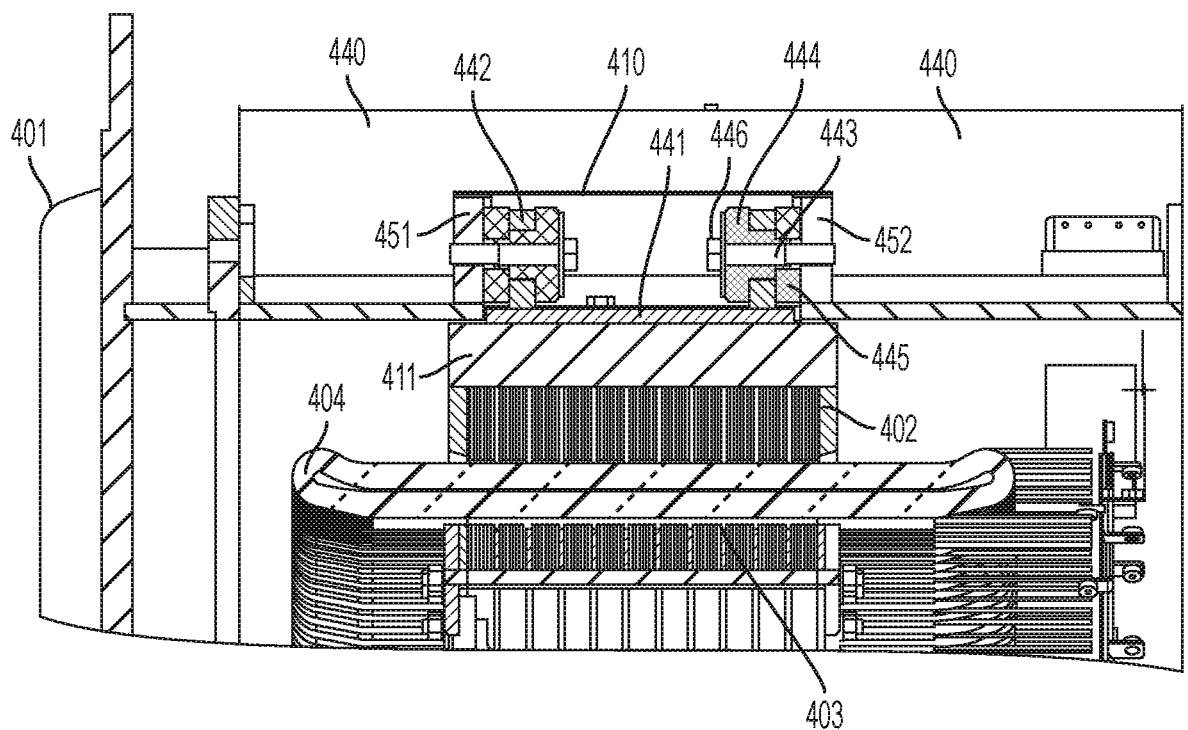
FIG. 4 shows an enlarged part of an electrical machine.

FIG. 4 shows an enlarged side view section of an electrical machine, similar to the one shown in FIGS. 1 to 3. It shows how the stator 402 is suspended by the structural isolation bars 410. The stator 402 is shown with a plurality of stator windings 404 and below the stator is the rotor 403 shown. The structural isolation bar 410, comprises a bottom plate 441 and two side plates 442. The bottom plate 441 is attached to space element 411, which again is connected to the stator 402. The two side plates 442 is attached to two stator housing flanges 451, 452, one at each end of the structural isolation bar 410. The isolated connection between the two side plates 442 and the two stator housing flanges 451, 452 is ensured by two insulation elements 440, each element has a first and a second side element 444, 445 in which a steel core 443 is inserted, working as bushing for a bolt 446. As the two side elements 444, 445 isolates the steel core 443 from the side plate 442, the stator 402 is isolated from the stator housing flange 452 and therefore also from the stator housing 401 itself.

Figure 5:
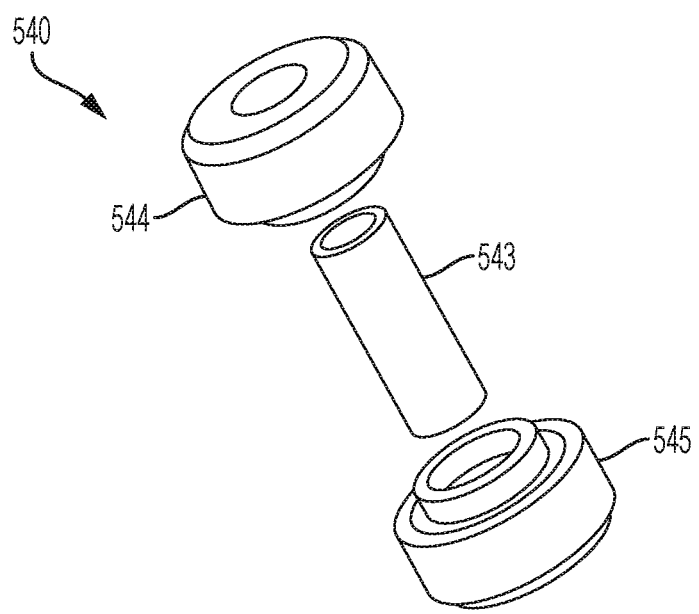
FIG. 5 shows an example of an isolations element.

FIG. 5 shows an example of an isolation element (440, 540) used for the suspension in FIG. 4. In detail the isolation element (540) comprises a first side element 544 and a second side element 545 and a steel core 543 to be inserted in the first and second insulation elements. The actual design of the insulation elements may vary, the function of the insulation elements 544, 545 is to isolate a suspended element from a structural support.

The first and second isolation elements can be made of rubber, but they are not restricted to be made of rubber, in fact they can be made of kinds of material which provides electrical isolation. Different materials have different mechanical properties, which will not be discussed here.

In an embodiment the isolation elements (440, 540) also provides a mechanical dampening function, whereby mechanical oscillations of the stator are dampened.

In an embodiment each of the structural isolation bars (410) comprises one or more insulation elements (440), with a first side element (444), a second side element (445), an inserted steel core (443) and a bolt (446) received in the steel core, the one or more insulation elements (440) insulate parts of the structural isolation bars (410) while the bolt (446) is arranged to be attached to a flange (451, 452) of the stator hosing (401).

Figure 6A:
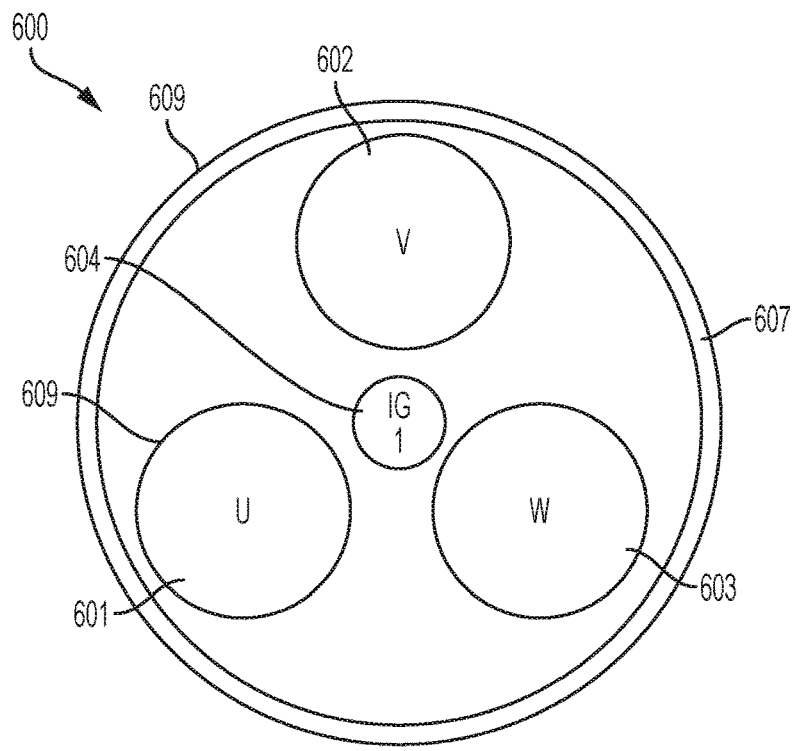
FIGS. 6a and 6b show examples of cables.

FIG. 6a shows the end view of an example of a cable 600 which can be used connecting the electrical generator to a frequency converter 750 in a wind turbine according to the embodiments presented. The cable 600 has three main phase conductors 601, 602, 603 symmetrically located each with an insulation layer 609. The cable 600 also comprises one return conductors 604 and a conductive shield (with optional external insulation covering) or a screen 607. The screen can be a braided screen and/or a foil screen as they provide shielding for different frequency ranges.

Figure 6B:
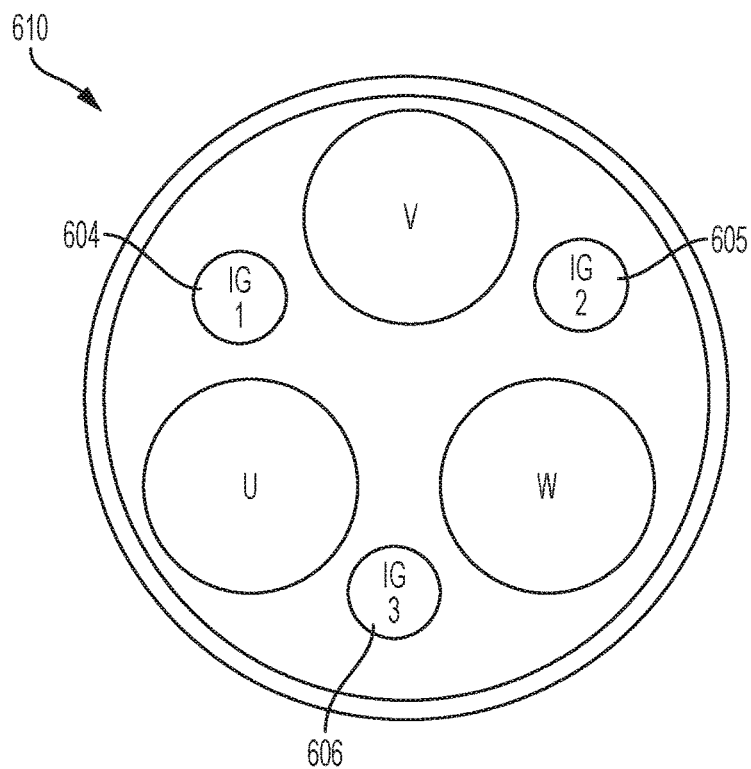

FIG. 6b shows the end view of an example of another cable 610 which can be used connecting the electrical generator to a frequency converter 750 in a wind turbine according to the embodiments presented. The cable 600 has three main phase conductors 601, 602, 603 symmetrically located, each with an insulation layer 609. The cable 600 also comprises three return conductors 604, 605, 606 also symmetrically located, and a screen 607.

To take maximum advantage of the isolated stator system, the power cable connections are preferred to be as shown in FIG. 6a, 6b. Power cable cores are arranged in equilateral triangle corresponding to the 3 phases, with separate isolated ground return. External conductive shield is used for conventional EMI control and also serves as safety ground.

Depending on size of generator or total current—power cables can be sub-divided into more than 1, each one duplicating the features of above.

Figure 7:
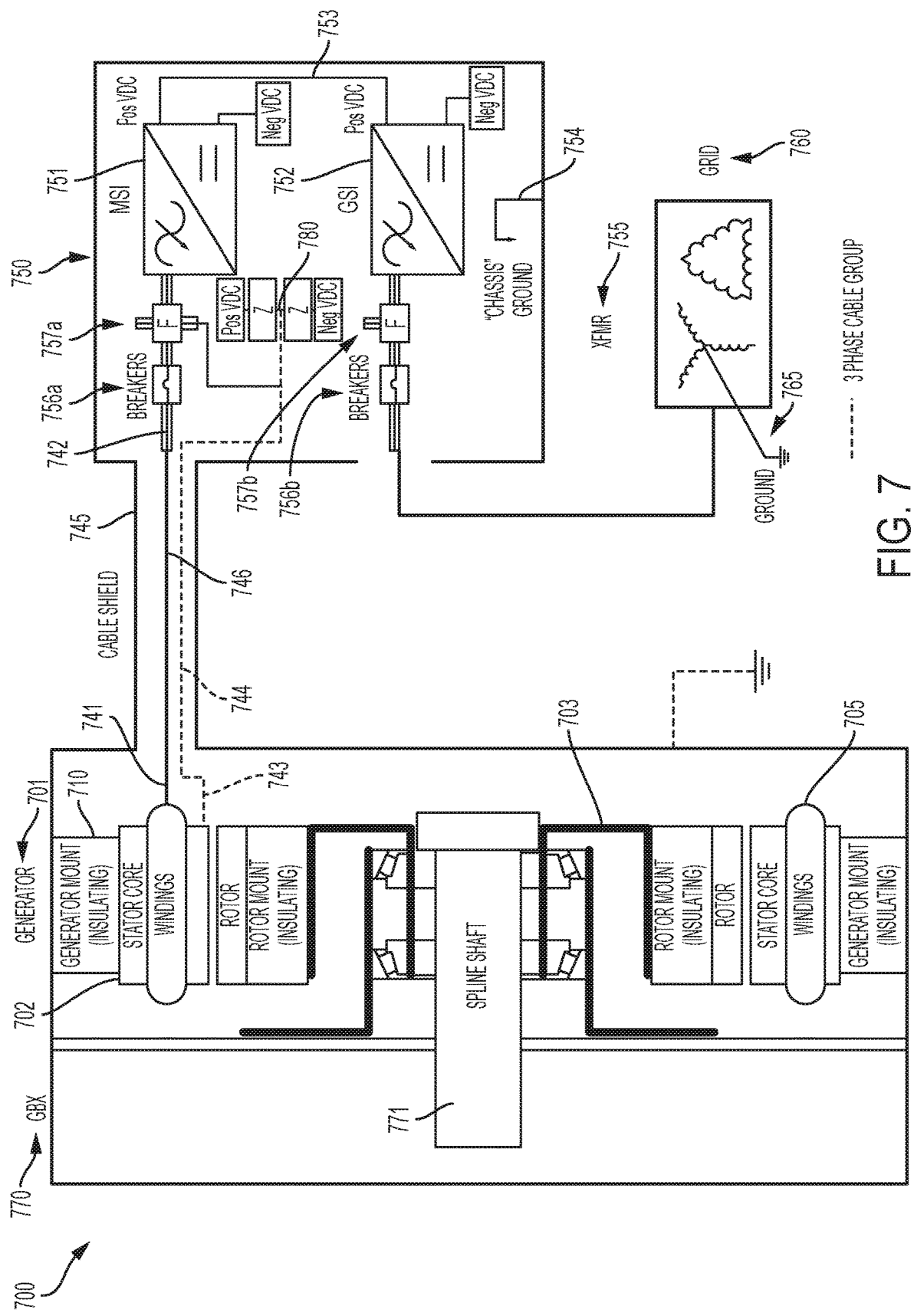
FIG. 7 shows grounding systems.

FIG. 7 shows schematics of an example of a wind turbine drive train 700. Starting from left to right, with a gearbox GBX 770, the low speed shaft (not shown) is connected to the wind turbine rotor 3. The gearbox 770 is mounted directly on to the generator housing 701, where the high speed side of the gearbox is connected to the generator through a spline shaft 771, rotating the rotor 703, which is supported by a number of bearings 704. The rotor 703 rotates within the stator 702 of the machine. Stator 702 has a plurality of stator windings 705, connected to a conductor 741 of the generator cable 740, for transmitting the generated electrical power to the frequency converter 750. The stator core 702 has an electrical terminal for a return path 743 for common mode noise.

In an embodiment the electrical machine is direct mounted together with a gearbox (770) by a spline shaft (771).

The effect of this embodiment is that a direct mounted gearbox is often prone to stray currents running from the generator shaft to the gearbox shaft, and from that, it either run into the bearing of the gearbox or causes sparks in the teeth of the gearbox. It is therefore very important that the stray currents are eliminated before they may cause damages to the gearbox.

The stator is suspended from the generator housing 701 by means of electrically isolated structural isolation bars 710 (only one is shown).

The frequency converter 750 converts in two steps, first the variable frequency power produced by the generator 701 is converted into DC power in machine side inverter 751. The DC power is fed through a DC bus 753 to a grid side inverter 752, which inverts the electrical power to AC power at the grid frequency 50 Hz or 60 Hz dependent on location. On both AC sides of the converters a breaker 756a, 756b is arranged so a disconnected from the power is possible, also on both sides a filter 757a, 757b is present. The filter 757a, 757b may only comprise an AC choke or also some kind of dv/dt filters and/or tuned filters to eliminate specific harmonics, either for harmonics generated in the generator or harmonics caused by the grid.

In an embodiment at least the machine side inverter filter 757a has a common mode filter with a connection terminal for the return path 743, wherein the common mode noise is handled.

The converter 750 has a common ground connection 754, which is essential in respect of the return path 743 from the stator 702, the common mode noise is sent back to the converter 750 through a cable return path 744 in the cable 740. The cable 740 comprises at least one conductor 746 for each electrical phase, a cable return path 744 and a cable shield 745, where the cable shield in one end is connected to the stator housing and in the other end connected to the converter cabinet.

In an embodiment the cable 740 is a cable duct surrounding the phase conductors 746 and the return path 744, which is shielded with a shield 745. The shield is terminated at generator housing 701 and converter cabinet 754.

The combination of the isolated stator core 702 from the generator housing 701, the cable shield 745, and the return path 743, 744 back to the converter 750 provides a solution to minimize or even eliminate bearing current issues in the electrical generator and also provides a solution to avoid stray currents in the gearbox 770. All installed in a wind turbine 1. The remedies to solve the problem has to be seen as a combination, where at least the isolated stator or the return path requires the other, in order to solve the problem.

All of the following element have to be considered: electrical power, shielding, grounding, filtering interfaces with the generator are key to controlling HF parasitic currents in a drivetrain 700.

Insulated ground(s) are connected to isolated stator core within generator at one end and then to suitable common mode neutral point at converter end.

Figure 8:
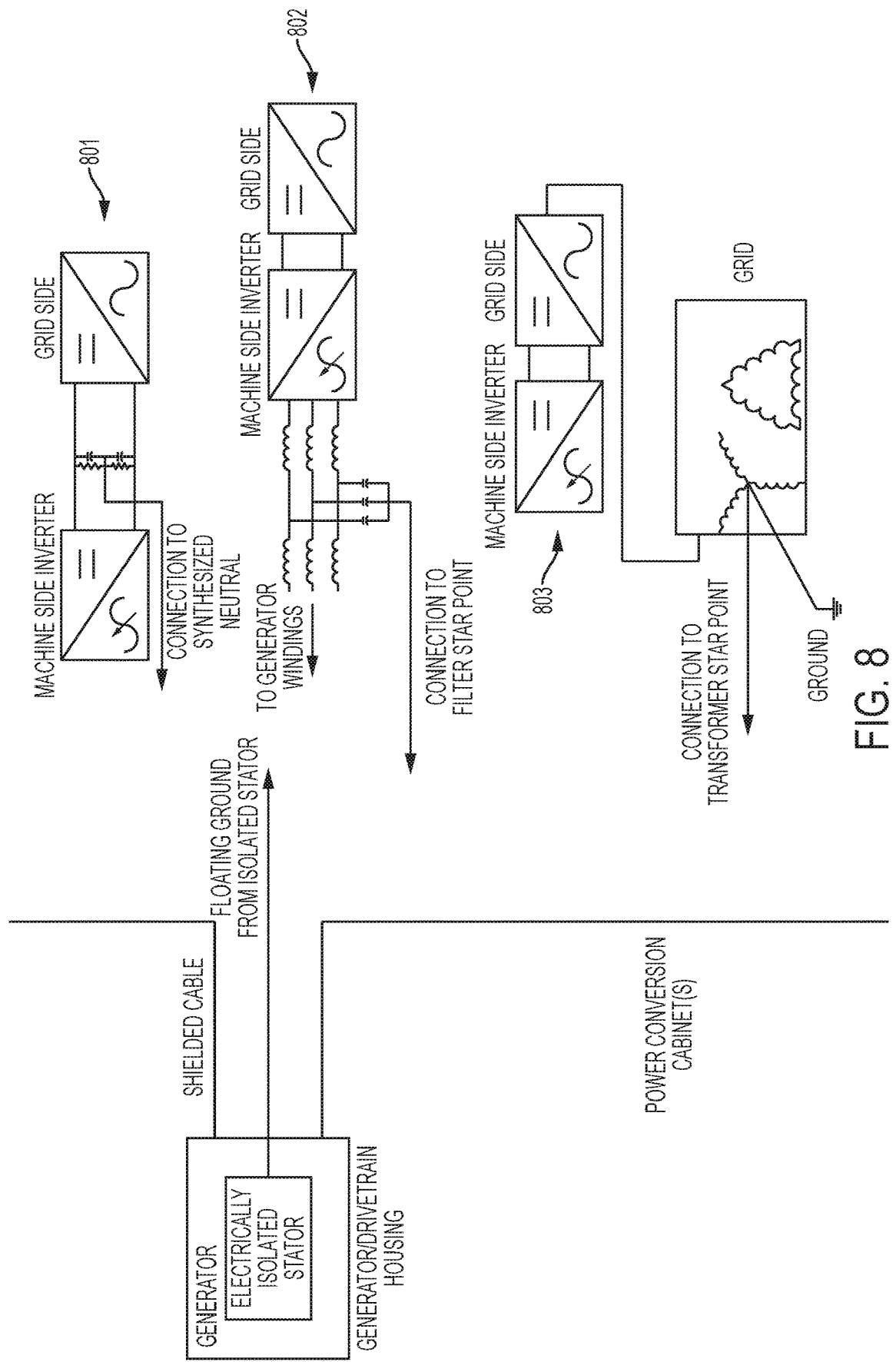
FIG. 8 shows a wind turbine.

FIG. 8 shows to the right side of the figure three examples of floating ground connection with reference ground in electrical power system, the list is not complete and other grounding systems also applies to the invention. The left side of FIG. 7 shows in a simple way a generator with a floating grounding return path from the stator core. The actual phase conductors are not shown as the FIG. 7 only relates to the grounding system.

The first system shown 801 has the grounding return connected at the center of the DC link, i.e. zero volt DC, which also can be seen as synthesized neutral.

The second system 802 has a common mode filter for the three phase conductors the filter comprises three capacitors connected to a star point. The star point works as the grounding return.

The third system 803 has the grounding return at the transformer connected between the frequency converter and the grid. The transformer is configured in Wye(star)/delta, the grounding return is the star point of the secondary side of the transformer.

Common feature for all proposed grounding systems is that floating ground return is connected to single point ground reference in the electrical power conversion system and does not share any connection with others systems, such as housing of the generator or converter cabinets.

Isolated ground return avoids any voltage gradients to be injected into drivetrain structure due to distributed impedances and parallel shared grounding paths. Voltage gradients is dominant in an electrical power conversion system, as the converters switches the voltage at the converter terminals from positive to negative level of the DC-link.

Cable shields is insulated from isolated stator ground return and makes galvanic connection at both ends to metal housing or cabinets (as is typical for EMI shields).

This is especially critical in medium speed directly or close coupled drivetrains where we don't have the easy treatments of hybrid bearings and insulating HSS coupling, connecting the gearbox shaft with the generator shaft.

The isolated stator core opens up a new set of grounding options for electrical machine and converter systems, where the key elements, can be seen as:
  Stator core is electrically isolated from housing
  Separate isolated current paths for common mode currents injected into stator and rest of ground system In general many different configurations is possible, but with common objective:
  Cable shields are around 3 phase groups,
  Dedicated isolated conductors for common mode capacitive currents,
  PE conductor can possible be integrated into shield—or another isolated dedicated ground connection,
  Power cable has three power cores (for 3 phases, 1 to 3 neutral current returns and one isolated ground shield)—Multiple cables of these will be needed.

In addition the FIG. 7 also shows a transformer 755 which is connected to the grid side inverter 752 at a secondary side and to an electrical grid 760 at the primary side. The secondary side has a wye connection with a ground terminal 765. The primary side has a delta connection.

In an embodiment, other transformer configuration may be used.

Figure 9:
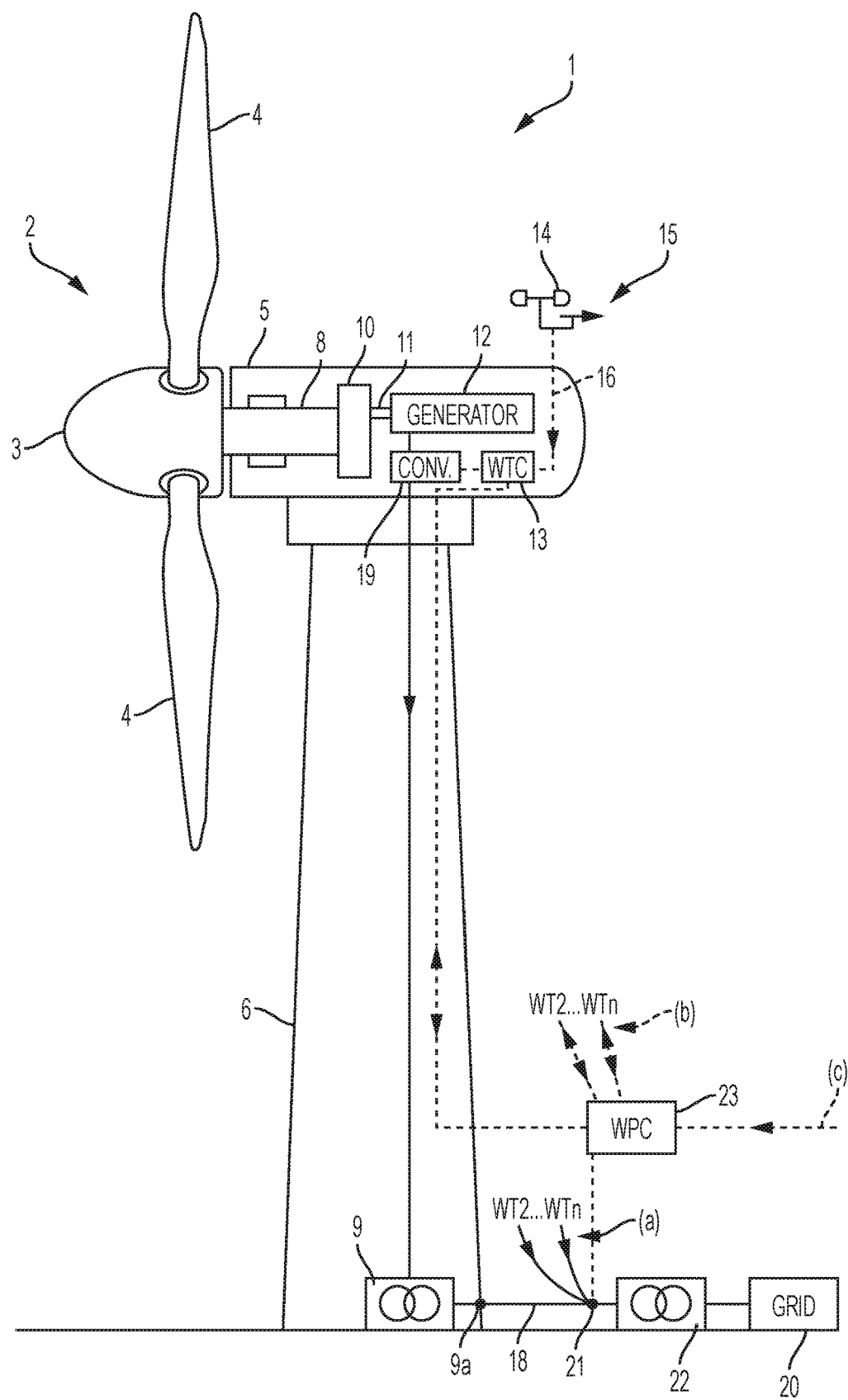

FIG. 9 shows; an exemplary wind turbine (WT) 1 is one of a plurality of wind turbines of a wind power plant (WPP). It has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high-speed gearbox shaft 11. This structure is exemplary; other embodiments, for example, use a setup where generator 12 and gearbox 10 are connected together as one block.

The generator 12 (e.g. Induction or synchronous generator) produces electrical output power of a frequency related to the rotation speed of the rotor 3, which is converted to grid frequency (e.g. about 50 or 60 Hz) by a power converter 19. The voltage of the electric power thus produced is up-transformed by a transformer 9. The output of the transformer 9 is the wind turbine generator's terminals 9a. The electric power from the wind turbine generator 1 and from the other wind turbine generators WT2, WTn of the wind power plant is fed into a wind power plant grid 18 (symbolized by reference "a" in FIG. 9). The wind power plant grid 18 is connected at a point of common coupling 21 and an optional further step up transformer 22 to a wind power plant external electrical utility grid 20. A control system includes a wind-turbine controller 13 and a power plant controller 23. The power plant controller 23 controls operation of the individual wind turbine generator 1.

In an embodiment the generator having a stator that are electrically isolated and with a direct mounted gearbox, the generator being a medium speed generator.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of this invention.

The invention claimed is:

1. A wind turbine comprising:
    an electrical machine comprising a stator with one or more electrical windings arranged to be connected to an electrical grid by at least one cable,
    wherein the at least one cable comprises at least one phase conductor, at least one return path to conduct leakage currents, and at least one electrical shield,
    wherein the stator is electrically isolated from a stator housing.

2. The wind turbine according to claim 1, wherein the one or more electrical windings are connected to the electrical grid through at least one power converter.

3. The wind turbine according to claim 2,
    wherein the return path for leakage currents is connected to the stator at a first end of the at least one cable, and
    wherein a second end of the at least one cable is connected to a DC link midpoint of the at least one power converter.

4. The wind turbine according to claim 2,
    wherein the return path for leakage currents is connected to the stator at a first end of the at least one cable, and
    wherein a second end of the at least one cable is connected to a star point of a common mode filter of the at least one power converter.

5. The wind turbine according to claim 2,
    wherein the return path for leakage currents is connected to the stator at a first end of the at least one cable,
    wherein a second end of the at least one cable is connected to a star point of a transformer, and
    wherein the transformer is connected between the at least one power converter and the electrical grid.

6. The wind turbine according to claim 2, wherein the at least one shield is connected at a first end with the stator housing and at a second end with a converter chassis.

7. The wind turbine according to claim 1, wherein the electrical machine is arranged to rotate within a speed range between 100 and 900 RPM.

8. The wind turbine according to claim 1,
    wherein the stator is electrically isolated from the stator housing by a plurality of structural isolation bars attached to the stator,
    wherein the plurality of structural isolation bars provide insulation between the stator and the stator housing, and
    wherein the stator is suspended within the stator housing.

9. The wind turbine according to claim 8, wherein each of the plurality of structural isolation bars comprises one or more insulation elements, with a first side element, a second side element, an inserted steel core and a bolt received in the steel core,
    wherein the one or more insulation elements insulate parts of the plurality of structural isolation bars while the bolt is arranged to be attached to a flange of the stator housing.

10. The wind turbine according to claim 1, wherein the electrical machine is direct mounted together with a gearbox by a spline shaft.

11. The wind turbine according to claim 9, wherein the one or more insulation elements also provide a mechanical dampening function.

12. A method for minimizing stray currents in an electrical machine in a wind turbine, wherein said electrical machine comprises a stator with one or more electrical windings, arranged to be connected to an electrical grid by at least one cable with at least one phase conductor, the method comprising:
    conducting leakage currents through at least one return path in the at least one cable;
    shielding the at least one cable with at least one electrical shield; and
    isolating the stator electrically from a stator housing.

13. The method according to claim 12, wherein the one or more electrical windings are connected to the electrical grid through at least one power converter.

\* \* \* \* \*